United States Patent
Li et al.

(10) Patent No.: US 12,236,233 B2
(45) Date of Patent: Feb. 25, 2025

(54) METHOD AND SYSTEM FOR AUTOMATICALLY AND QUICKLY DEPLOYING FRONT-END PROCESSOR BASED ON GRAY RELEASE

(71) Applicant: ZHEJIANG LAB, Zhejiang (CN)

(72) Inventors: Jingsong Li, Hangzhou (CN); Hongyi Ni, Hangzhou (CN); Tianshu Zhou, Hangzhou (CN); Yu Tian, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/360,840

(22) Filed: Jul. 28, 2023

(65) Prior Publication Data

US 2024/0036860 A1     Feb. 1, 2024

(30) Foreign Application Priority Data

Jul. 29, 2022    (CN) .......................... 202210902898.6

(51) Int. Cl.
*G06F 8/71*     (2018.01)
*G06F 8/65*     (2018.01)

(52) U.S. Cl.
CPC . *G06F 8/71* (2013.01); *G06F 8/65* (2013.01)

(58) Field of Classification Search
CPC ..... G06F 8/71; G06F 8/65; G06F 8/60; G06F 11/3664; G06F 2201/865; G06F 11/1433
See application file for complete search history.

(56) References Cited

U.S. PATENT DOCUMENTS 11,157,253 B1   10/2021   Shteyman et al.
11,599,837 B2 *   3/2023   Krishnaswamy ......... G06F 8/60
(Continued)

FOREIGN PATENT DOCUMENTS

CN    109240669 A    1/2019
CN    109240716 A    1/2019
(Continued)

OTHER PUBLICATIONS

Notice Of Allowance(CN202210902898.6); Date of Mailing: Sep. 27, 2022.
First Office Action(CN202210902898.6); Date of Mailing: Sep. 16, 2022.
(Continued)

*Primary Examiner* — S. Sough
*Assistant Examiner* — Cheneca Smith
(74) *Attorney, Agent, or Firm* — W&G Law Group

(57) ABSTRACT

The present disclosure discloses a method and system for automatically and quickly deploying a front-end processor based on gray release. The system includes a user management module, a front-end processor engineering configuration module, a version iteration module and an engineering code version management repository, where the version iteration module is connected with the engineering code version management repository, the user management module and the front-end processor engineering configuration module, a code is obtained through the engineering code version management repository to perform updating or rollback of a current code, an operating permission of the front-end processor is obtained by using the user management module, an engineering configuration parameter is obtained from the front-end processor engineering configuration module for engineering gray release of a plurality of front-end processors, and a task scheduling function therein is called.

10 Claims, 7 Drawing Sheets

(56) References Cited

U.S. PATENT DOCUMENTS

| | | | |
|---|---|---|---|
| 11,829,743 B2* | 11/2023 | Verma | G06F 9/451 |
| 2017/0147476 A1 | 5/2017 | Ji | |
| 2019/0034315 A1* | 1/2019 | Acosta | G06F 8/658 |
| 2022/0413845 A1* | 12/2022 | Mathew | G06F 11/3452 |

FOREIGN PATENT DOCUMENTS

| | | |
|---|---|---|
| CN | 111158715 A | 5/2020 |
| CN | 111949311 A | 11/2020 |
| CN | 112579289 A | 3/2021 |
| CN | 112905199 A | 6/2021 |
| CN | 113918276 A | 1/2022 |
| CN | 114615135 A | 6/2022 |
| WO | 2020181684 A1 | 9/2020 |
| WO | 2021179633 A1 | 9/2021 |
| WO | 2022001209 A1 | 1/2022 |

OTHER PUBLICATIONS

Design-And-Implementation-Of-Application-Automation-Deployment-System-On-Container-Cloud-Platform.
Design-and-Implementation-of-Gray-Publishing-System-under-Distributed-Application-Microservice.

* cited by examiner

METHOD AND SYSTEM FOR AUTOMATICALLY AND QUICKLY DEPLOYING FRONT-END PROCESSOR BASED ON GRAY RELEASE

CROSS-REFERENCE TO RELATED APPLICATIONS

The present application claims priority to Chinese Patent Application No. 202210902898.6, filed on Jul. 29, 2022, the content of which is incorporated herein by reference in its entirety.

TECHNICAL FIELD

The present disclosure relates to the technical field of software management, in particular to a method and a system for automatically and quickly deploying a front-end processor based on gray release.

BACKGROUND

With rapid development of a software industry, an engineering application is becoming increasingly widespread, and the same engineering application is usually deployed on different front-end processor servers according to different environmental parameters and runtime configurations. A central computer for version management and engineering deployment has only one server, if a network of a front-end processor is restricted to only use an intranet or only interact with the central computer, when an engineering version needs to be updated, engineering on the front-end processor needs to be packed on a single central computer server respectively according to different environments and then is transmitted, thus a large amount of time and internal memory space will be consumed. Besides, in engineering where a plurality of front-end processors are started, a problem will be caused that neither updating nor deployment can be performed at the same time, thus engineering versions on the front-end processors are inconsistent, and the front-end processors cannot be interconnected and respond. Besides, it is possible that new engineering cannot be compatible with all front-end processors at the same time, resulting in inconsistent engineering versions on all front-end processors, and a collective rollback of the engineering versions may be needed.

At the moment, gray release is needed, such that the engineering versions may be smoothly transited. An A/B test is performed in a process of releasing, that is, some servers continue using a previous version of the engineering, the other servers may preferentially use a next version of the engineering, so as to guarantee stability of an entire system, and problems may be discovered and adjusted in an initial gray scale to ensure an influence degree thereof. Currently, the function of gray release is generally not used in the release system on the market, and even if the function is used, reasonable task scheduling of automatic deployment is performed neither according to a feature of gray release nor in combination with an actual running situation of the server, which leads to the problems of long total deployment time, low efficiency, and incapability to rollback.

Therefore, a method and a system for automatically and quickly deploying a front-end processor based on gray release are provided so as to solve the above technical problem.

SUMMARY

In order to solve the above technical problem, the present disclosure provides a method and system for automatically and quickly deploying a front-end processor based on gray release.

Technical solutions adopted by the present disclosure are as follows:

A method for automatically and quickly deploying a front-end processor based on gray release includes the following steps:

step S1: performing version management on to-be-deployed engineering by using an engineering code version management repository, the engineering code version management repository being deployed on a remote server;

step S2: logging in a user management module for identity identification, and verification of an operating permission for a plurality of front-end processors and an operating permission for engineering configurations of the plurality of front-end processors;

step S3: performing parameter extraction on the front-end processors, arranging all the front-end processors in a sequence according to extracted parameters, and performing gray release deployment preferentially on the top front-end processors in the sequence;

step S4: when gray release deployment is to be performed on 10% of the front-end processors, sequentially deploying top 10% of the front-end processors in a total front-end processor queue and performing a gray scale test after deployment is completed, and when the number of front-end processors meeting smoothness of new and old function ports and overall running stability of a system accounts for greater than or equal to 90% of the number of deployed front-end processors, continuing gray release; and otherwise, performing version rollback on the deployed front-end processors till engineering on all front-end processors returns to a previous version, and finishing the gray release;

step S5: when the gray release deployment is to be performed on 10% to 40% of the front-end processors, reordering the rest 90% of the front-end processors according to step S3, sequentially deploying the top front-end processors, accounting for 30% of the total number of the front-end processors, in the rest of front-end processors, performing a gray scale test after deployment is completed, and when the number of the front-end processors meeting smoothness of new and old function ports and overall running stability of the system accounts for greater than or equal to 90% of the number of deployed front-end processors, continuing gray release; and otherwise, performing version rollback on the deployed front-end processors till engineering on all front-end processors returns to a previous version, and finishing the gray release; and step S6: when the gray release needs to be performed on the rest 60% of the front-end processors, reordering the rest of front-end processors according to step S3, sequentially deploying the rest of front-end processors, and performing a gray scale test after deployment is completed, and when the number of the front-end processors meeting smoothness of new and old function ports and overall running stability of the system accounts for greater than or equal to 90% of the number of deployed front-end processors, performing troubleshooting manually on unsuccessfully deployed front-end processors for manually updating deployment; and otherwise, performing version rollback on the deployed front-end processors till engineering on all front-end processors returns to a previous version.

Further, step S3 specifically includes the following sub-steps:

sub-step S31: performing parameter extraction on each front-end processor;

sub-step S32: performing classification by using a decision-making tree according to a current CPU load situation of the front-end processor to sequentially obtain a plurality of initial sequences;

sub-step S33: performing in-sequence ordering in each initial sequence in combination with a remaining amount of an internal memory of the front-end processor, a size of an update package and expected transmission time to obtain a sequence; and sub-step S34: determining a sequence number of each front-end processor in each sequence, arranging all front-end processors in the sequence and according to positions in the sequence, and performing gray release deployment preferentially on the top front-end processors in the sequence.

Further, sub-step S31 specifically includes the following sub-steps:

sub-step S311: extracting a remaining amount of an internal memory of the current front-end processor;

sub-step S312: extracting a network bandwidth;

sub-step S313: extracting the size of the update package; and sub-step S314: calculating the expected transmission time of the update package according to the network bandwidth and the size of the update package.

Further, specifically, sub-step S32 is performing sequence dividing on to-be-deployed front-end processors according to a CPU load average and the number of CPU cores, and four dividing conditions are as follows:

dividing the front-end processors where a load average of one minute is smaller than the number of the CPU cores into a first sequence;

dividing the front-end processors where a load average of one minute is greater than or equal to the number of the CPU cores and the front-end processors where a load average of five minutes is smaller than the number of the CPU cores into a second sequence;

dividing the front-end processors where a load average of one minute is greater than or equal to the number of the CPU cores, the front-end processors where a load average of five minutes is greater or equal to the number of the CPU cores and the front-end processors where a load average of fifteen minutes is smaller than the number of the CPU cores into a third sequence; and dividing the rest of front-end processors into a fourth sequence.

Further, sub-step S33 specifically includes the following sub-steps:

sub-step S331: composing the remaining amount of the internal memory of the front-end processor, the size of the update package and the expected transmission time into a matrix;

sub-step S332: performing zero-mean normalization on each row of the matrix;

sub-step S333: obtaining a covariance matrix;

sub-step S334: obtaining an eigenvalue and a corresponding eigenvector of the covariance matrix;

sub-step S335: arranging eigenvectors by row, from top to bottom, according to sizes of corresponding eigenvalues to form a new matrix;

sub-step S336: taking data which is one-dimension through dimensionality reduction to obtain a feature component, and calculating expected total deployment time of each front-end processor; and sub-step S337: arranging the front-end processors in a positive sequence according to the expected total deployment time, where the shorter the total deployment time, the more front the sequence numbers of the front-end processors.

Further, a specific method of deployment includes the following steps:

step 1: sending, by a user, an automatic deployment request of front-end processor engineering to a central computer by using a version iteration module, downloading, by the central computer, a version code corresponding to the engineering from the engineering code version management repository, generating an engineering update package in combination with an engineering version of the current front-end processor, and compressing the engineering update package by using an ssh agent;

step 2: transmitting the compressed engineering update package onto a position corresponding to engineering of the current front-end processor and performing decompression to obtain a decompressed update package;

step 3: pulling down, by the user, a front-end processor engineering parameter corresponding to an operation of this time from a front-end processor engineering configuration module to a front-end processor engineering directory;

step 4: sending, by the user, a request for finally updating the engineering to the current front-end processor, packing the engineering after the current front-end processor receives the request, and executing a startup script to run the engineering in a docker container; and step 5: automatically deleting, by the current front-end processor, an engineering code for packing to complete engineering deployment.

Further, in step 1, the automatic deployment request includes address information of a to-be-deployed front-end processor, transmission verification information, an environment corresponding to the front-end processor engineering and a version number of the to-be-deployed engineering.

Further, step 3 further includes performing, by the user, configuration parameter management corresponding to the front-end processor after the user logs in the front-end processor engineering configuration module when the front-end processor needs to be adjusted in a running configuration parameter; where the running configuration parameter of the front-end processor is stored in a database of the central computer in a form of key-value pair according to the front-end processor and a running environment, the configuration parameter management refers to an operation on a level of a database, the stored running configuration parameter is transmitted to a directory corresponding to the front-end processor engineering generated in step 2, so as to automatically generate a configuration file, taking java engineering as an example, that is, a configuration file is generated under a resource directory.

Further, step 4 specifically includes running an automatic deployment script on the front-end processor by using the ssh agent, where the step of the automatic deployment script is sequentially: engineering packing, container stopping running, container deletion, mirror image deletion, new mirror image re-establishment, container re-establishment and container running.

The present disclosure further provides a system for automatically and quickly deploying a front-end processor based on gray release, including: a user management module, a front-end processor engineering configuration module, a version iteration module and an engineering code version management repository, where the version iteration module is connected with the engineering code version management repository, the user management module and the front-end processor engineering configuration module, a code is obtained through the engineering code version management repository to perform updating or rollback of a current code, an operating permission of the front-end processor is obtained by using the user management module, an engineering configuration parameter is obtained from the front-end processor engineering configuration module for engineering gray release of a plurality of front-end processors, and a task scheduling function therein is called;

- the user management module is configured to perform an adding, deleting, checking and changing operation for a user, to configure an operating permission of each user, to improve security of system version iteration and, to provide a function of logging in or logging out of the system, where user information is recorded in a background database of a central computer;
- the front-end processor engineering configuration module is configured to distinguish configuration information needed for engineering packing by each front-end processor under each environment, to create an environment needed for engineering normal running, to provide an adding, deleting, checking and changing operation, to store in the background database of the central computer in a form of a front-end processor serial number, a running environment and a configuration entry key-value pair in a unified mode and, to provide a configuration parameter corresponding to engineering for the version iteration module during automatic deployment each time;
- the version iteration module is configured to monitor and record current running environment information of each front-end processor, to use the information as a basis of user remote management, control over the front-end processor and making a release strategy by optimizing a gray release sequence through an algorithm and, to provide an adding, deleting, checking and changing operation, where version iteration information of each environment of the front-end processor is recorded in the background database of the central computer; and the engineering code version management repository is configured to store and manage each version code of the engineering.

The present disclosure has the beneficial effects:

1, The present disclosure dynamically manages an engineering version of the front-end processor and endows an engineering configuration according to the environment by dynamically searching for an operating permission of an operator and regulating an operating behavior of the operator, performs automatic deployment in combination with an actual running condition of each server and guarantees system security and flexibility and robustness of the engineering on the front-end processor servers.

2. As it cannot be guaranteed that a new version can adapt to all the front-end processors servers, the present disclosure performs gray release to guarantee stability of the entire system, and a problem may be discovered and adjusted during an initial gray scale, so as to guarantee smooth transition of a previous version and a next version of the system.

3. A front-end processor operator and a higher-level operator need to operate, update and deploy the plurality of front-end processor servers at a time and a lot of time is consumed during engineering packing, transmission and start of the front-end processors, so in order to make gray release faster, the present disclosure introduces the task scheduling function to shorten whole deployment time.

DESCRIPTION OF EMBODIMENTS

The following description for at least one exemplary embodiment is actually merely explanatory and definitely does not serve as any limitation on the present disclosure and an application or use thereof. Based on embodiments in the present disclosure, all other embodiments obtained by those ordinarily skilled in the art without creative efforts fall within the protection scope of the present disclosure.

Figure 1:
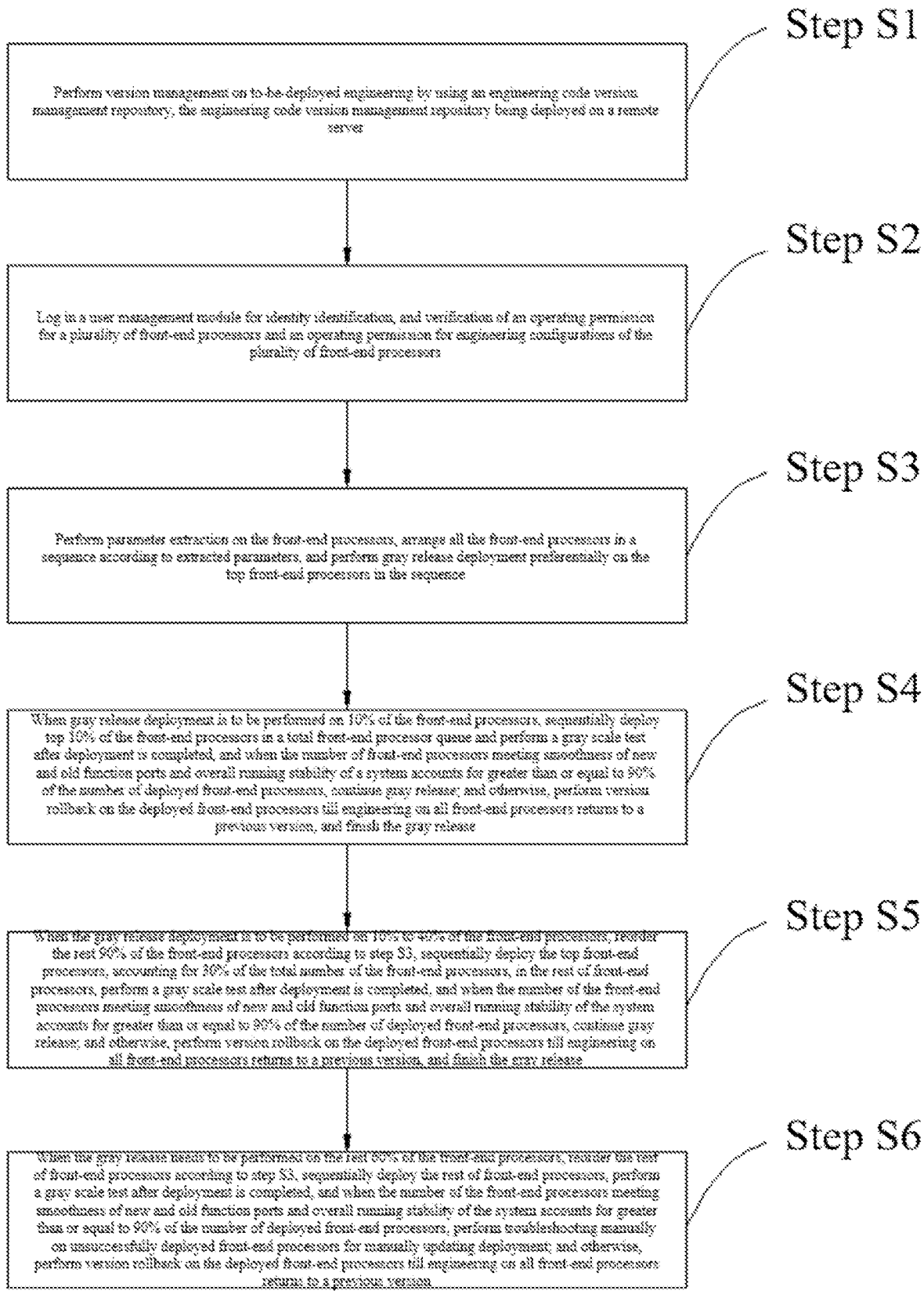
FIG. 1 is a flowchart of a method for automatically and quickly deploying a front-end processor based on gray release in the present disclosure.

Referring to FIG. 1, a method for automatically and quickly deploying a front-end processor based on gray release includes the following steps:

- Step S1: version management is performed on to-be-deployed engineering by using an engineering code version management repository, the engineering code version management repository being deployed on a remote server.
- Step S2: a user management module is logged in for identity identification, and verification of an operating permission for a plurality of front-end processors and an operating permission for engineering configurations of the plurality of front-end processors.
- Step S3: parameter extraction is performed on the front-end processors, all the front-end processors are arranged in a sequence according to extracted parameters, and gray release deployment is performed on the top front-end processors in the sequence preferentially.
- Sub-step S31: parameter extraction is performed on each front-end processor.

Sub-step S311: a remaining amount of an internal memory of the current front-end processor is extracted.

Sub-step S312: a network bandwidth is extracted.

Sub-step S313: the size of the update package is extracted.

Sub-step S314: the expected transmission time of the update package is calculated according to the network bandwidth and the size of the update package.

Sub-step S32: classification is performed by using a decision-making tree according to a current CPU load situation of the front-end processor to sequentially obtain a plurality of initial sequences.

Specifically, sequence dividing is performed on to-be-deployed front-end processors according to a CPU load average and the number of CPU cores, and four dividing conditions are as follows:

dividing the front-end processors where a load average of one minute is smaller than the number of the CPU cores into a first sequence;

dividing the front-end processors where a load average of one minute is greater than or equal to the number of the CPU cores and the front-end processors where a load average of five minutes is smaller than the number of the CPU cores into a second sequence;

dividing the front-end processors where a load average of one minute is greater than or equal to the number of the CPU cores, the front-end processors where a load average of five minutes is greater or equal to the number of the CPU cores and the front-end processors where a load average of fifteen minutes is smaller than the number of the CPU cores into a third sequence; and dividing the rest of front-end processors into a fourth sequence.

Sub-step S33: in-sequence ordering is performed in each initial sequence in combination with a remaining amount of an internal memory of the front-end processor, a size of an update package and expected transmission time to obtain a sequence.

Sub-step S331: the remaining amount of the internal memory of the front-end processor, the size of the update package and the expected transmission time are composed into a matrix.

Sub-step S332: zero-mean normalization is performed on each row of the matrix.

Sub-step S333: a covariance matrix is obtained.

Sub-step S334: an eigenvalue and a corresponding eigenvector of the covariance matrix are obtained;

Sub-step S335: eigenvectors are arranged by row, from top to bottom, according to sizes of corresponding eigenvalues to form a new matrix.

Sub-step S336: data which is one-dimension through dimensionality reduction are taken to obtain a feature component, and expected total deployment time of each front-end processor is calculated.

Sub-step S337: the front-end processors are arranged in a positive sequence according to the expected total deployment time, where the shorter the total deployment time, the more forward the sequence numbers of the front-end processors.

Sub-step S34: a sequence number of each front-end processor in each sequence is determined, all front-end processors are arranged in the sequence and according to positions in the sequence, and gray release deployment is performed on the top front-end processors in the sequence preferentially.

Step S4: when gray release deployment is to be performed on 10% of the front-end processors, top 10% of the front-end processors in a total front-end processor queue are sequentially deployed and a gray scale test is performed after deployment is completed, and when the number of front-end processors meeting smoothness of new and old function ports and overall running stability of a system accounts for greater than or equal to 90% of the number of deployed front-end processors, gray release is continued; and otherwise, version rollback is performed on the deployed front-end processors till engineering on all front-end processors returns to a previous version, and the gray release is finished.

Step S5: when the gray release deployment is to be performed on 10% to 40% of the front-end processors, the rest 90% of the front-end processors need to be reordered according to step S3, the top front-end processors, accounting for 30% of the total number of the front-end processors, in the rest of front-end processors are sequentially deployed, a gray scale test is performed after deployment is completed, and when the number of the front-end processors meeting smoothness of new and old function ports and overall running stability of the system accounts for greater than or equal to 90% of the number of deployed front-end processors, gray release is continued; and otherwise, version rollback is performed on the deployed front-end processors till engineering on all front-end processors returns to a previous version, and the gray release is finished.

Step S6: when the gray release needs to be performed on the rest 60% of the front-end processors, the rest of front-end processors need to be reordered according to step S3, the rest of front-end processors are sequentially deployed, a gray scale test is performed after deployment is completed, and when the number of the front-end processors meeting smoothness of new and old function ports and overall running stability of the system accounts for greater than or equal to 90% of the number of deployed front-end processors, troubleshooting is performed manually on unsuccessfully deployed front-end processors for manually updating deployment; and otherwise, version rollback is performed on the deployed front-end processors till engineering on all front-end processors returns to a previous version.

A specific method of deployment includes the following steps:

step 1: a user sends an automatic deployment request of front-end processor engineering to the central computer by using a version iteration module, and the central computer downloads a version code corresponding to the engineering from the engineering code version management repository, generates an engineering update package in combination with an engineering version of the current front-end processor, and compresses the engineering update package by using an ssh agent;

the automatic deployment request including address information of a to-be-deployed front-end processor, transmission verification information, an environment corresponding to the front-end processor engineering and a version number of the to-be-deployed engineering.

Step 2: the compressed engineering update package is transmitted onto a position corresponding to engineering of the current front-end processor and decompressed to obtain a decompressed update package.

Step 3: the user pulls down a front-end processor engineering parameter corresponding to an operation of this time from a front-end processor engineering configuration module to a front-end processor engineering directory.

Step 3 further includes performing, by the user, configuration parameter management corresponding to the front-end processor after the user logs in the front-end processor engineering configuration module when the front-end processor needs to be adjusted in a running configuration parameter; where the running configuration parameter of the front-end processor is stored in a database of the central computer in a form of key-value pair according to the front-end processor and a running environment, the configuration parameter management refers to an operation on a level of a database, the stored running configuration parameter is transmitted to a directory corresponding to the front-end processor engineering generated in step 2, so as to automatically generate a configuration file, taking java engineering as an example, that is, a configuration file is generated under a resource directory.

Step 4: the user sends a request for finally updating the engineering to the current front-end processor, the engineering is packed after the current front-end processor receives the request, and a startup script is executed to run the engineering in a docker container.

Step 4 specifically includes running an automatic deployment script on the front-end processor by using the ssh agent, where the step of the automatic deployment script is sequentially: engineering packing, container stopping running, container deletion, mirror image deletion, new mirror image re-establishment, container re-establishment and container running.

Step 5: the current front-end processor automatically deletes an engineering code for packing to complete engineering deployment.

Figure 2:
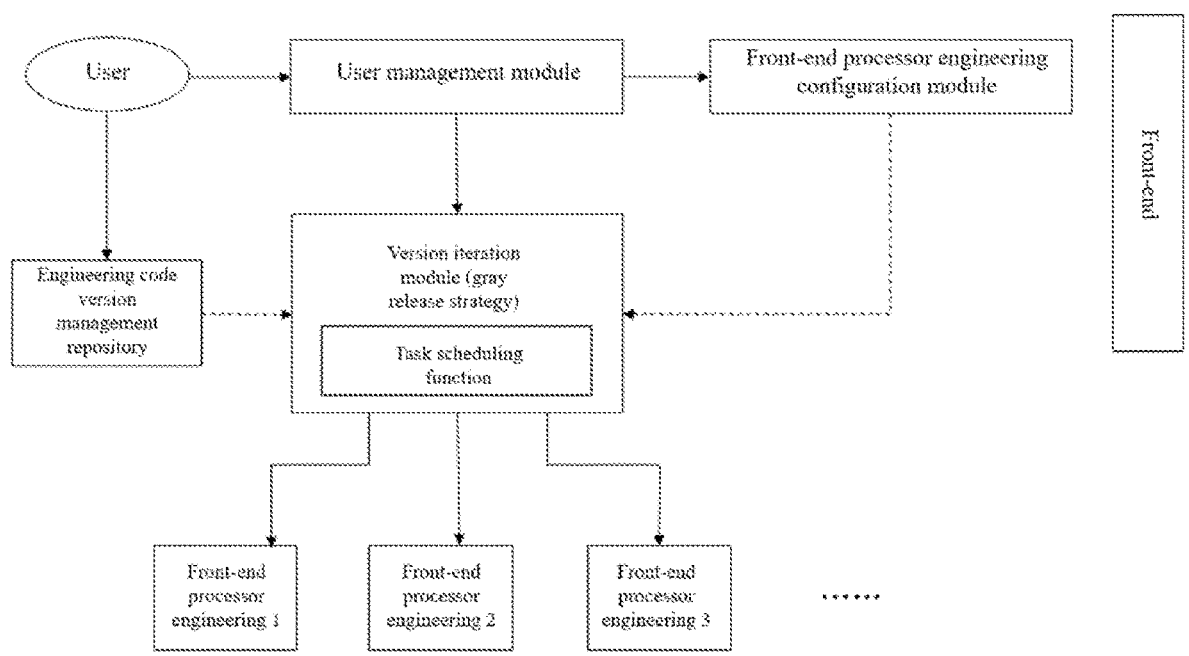
FIG. 2 is a schematic diagram of a system for automatically and quickly deploying a front-end processor based on gray release in the present disclosure.

Referring to FIG. 2, a system for automatically and quickly deploying a front-end processor based on gray release includes: a user management module, a front-end processor engineering configuration module, a version iteration module and an engineering code version management repository. The version iteration module is connected with the engineering code version management repository, the user management module and the front-end processor engineering configuration module, a code is obtained through the engineering code version management repository to perform updating or rollback of a current code, an operating permission of the front-end processor is obtained by using the user management module, an engineering configuration parameter is obtained from the front-end processor engineering configuration module for engineering gray release of a plurality of front-end processors, and a task scheduling function therein is called.

The user management module is configured to perform an adding, deleting, checking and changing operation for a user, to configure an operating permission of each user, to improve security of system version iteration and, to provide a function of logging in or logging out of the system, where user information is recorded in a background database of a central computer.

A high-level user may manage a low-level user in the user management module. For example, a front-end processor administrator may manage an ordinary operator to endow and withdraw an operating permission, newly add and delete a user and perform other operations, and a system administrator may manage the front-end processor administrator to endow operations, such as granting and withdrawing a front-end processor permission, to the front-end processor administrator.

The front-end processor engineering configuration module is configured to distinguish configuration information needed for engineering packing by each front-end processor under each environment, to create an environment needed for engineering normal running, to provide an adding, deleting, checking and changing operation, to store in the background database of the central computer in a form of a front-end processor serial number, a running environment and a configuration entry key-value pair in a unified mode and, to provide a configuration parameter corresponding to engineering for the version iteration module during automatic deployment each time; and a configuration file in the engineering is split into a plurality of pieces to be stored in the background database of the central computer in a form of the front-end processor serial number, the running environment and the configuration entry key-value pair in a unified mode. Changing a configuration is switched to changing a database, and a configuration file is regenerated in front-end processor engineering by accessing the database during updating. Thus, during automatic deployment each time, the configuration parameter corresponding to the engineering is necessarily provided for the version iteration module so as to make the engineering run normally.

The version iteration module is configured to monitor and record current running environment information of each front-end processor, to use the information as a basis of user remote management, control over the front-end processor and making a release strategy by optimizing a gray release sequence through an algorithm and, to provide an adding, deleting, checking and changing operation, where version iteration information of each environment of the front-end processor is recorded in the background database of the central computer; and the engineering code version management repository is configured to store and manage each version code of the engineering.

Embodiment

Figure 3:
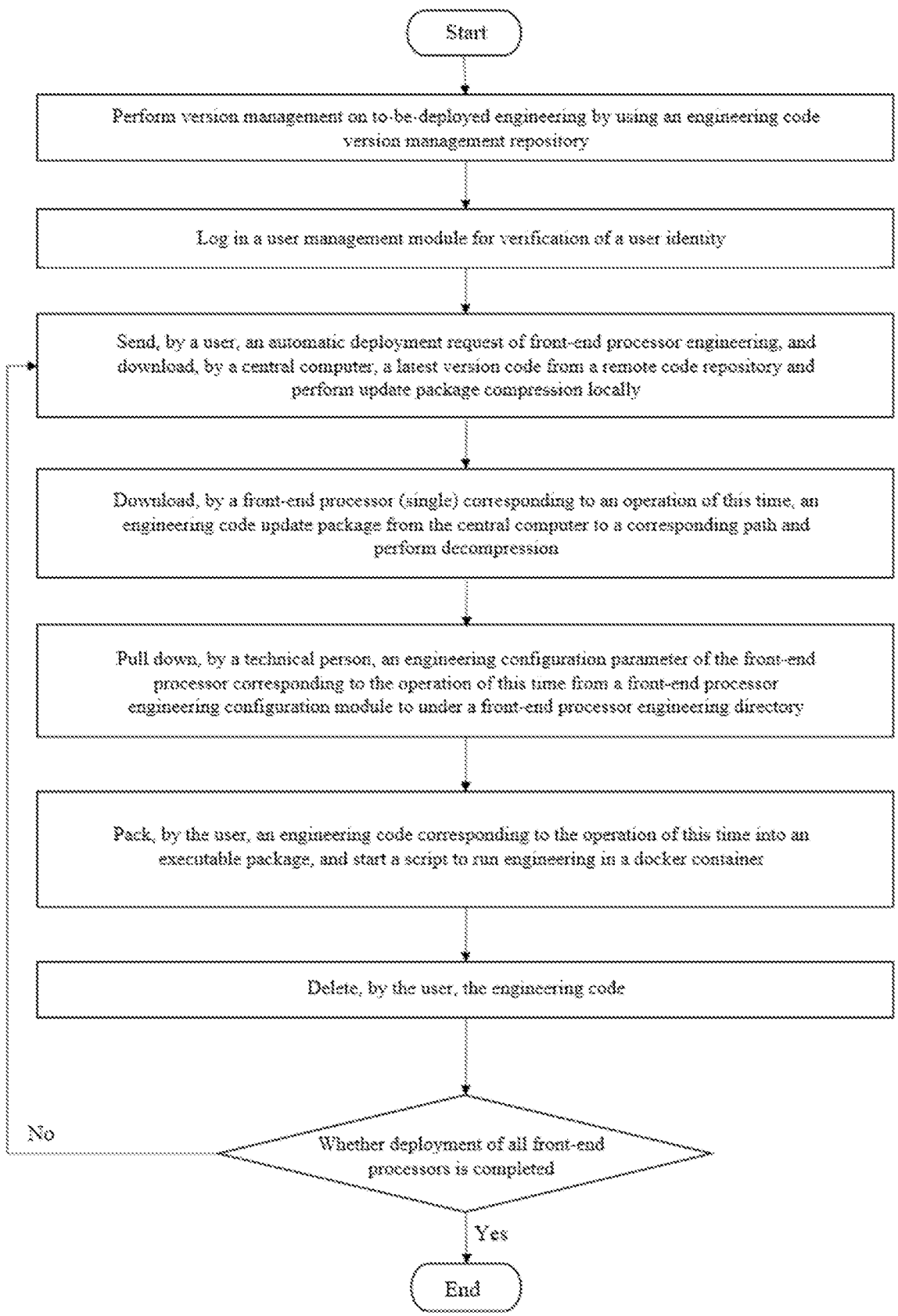
FIG. 3 is a schematic diagram of a method for automatically deploying a plurality of front-end processors in an embodiment.
Figure 4:
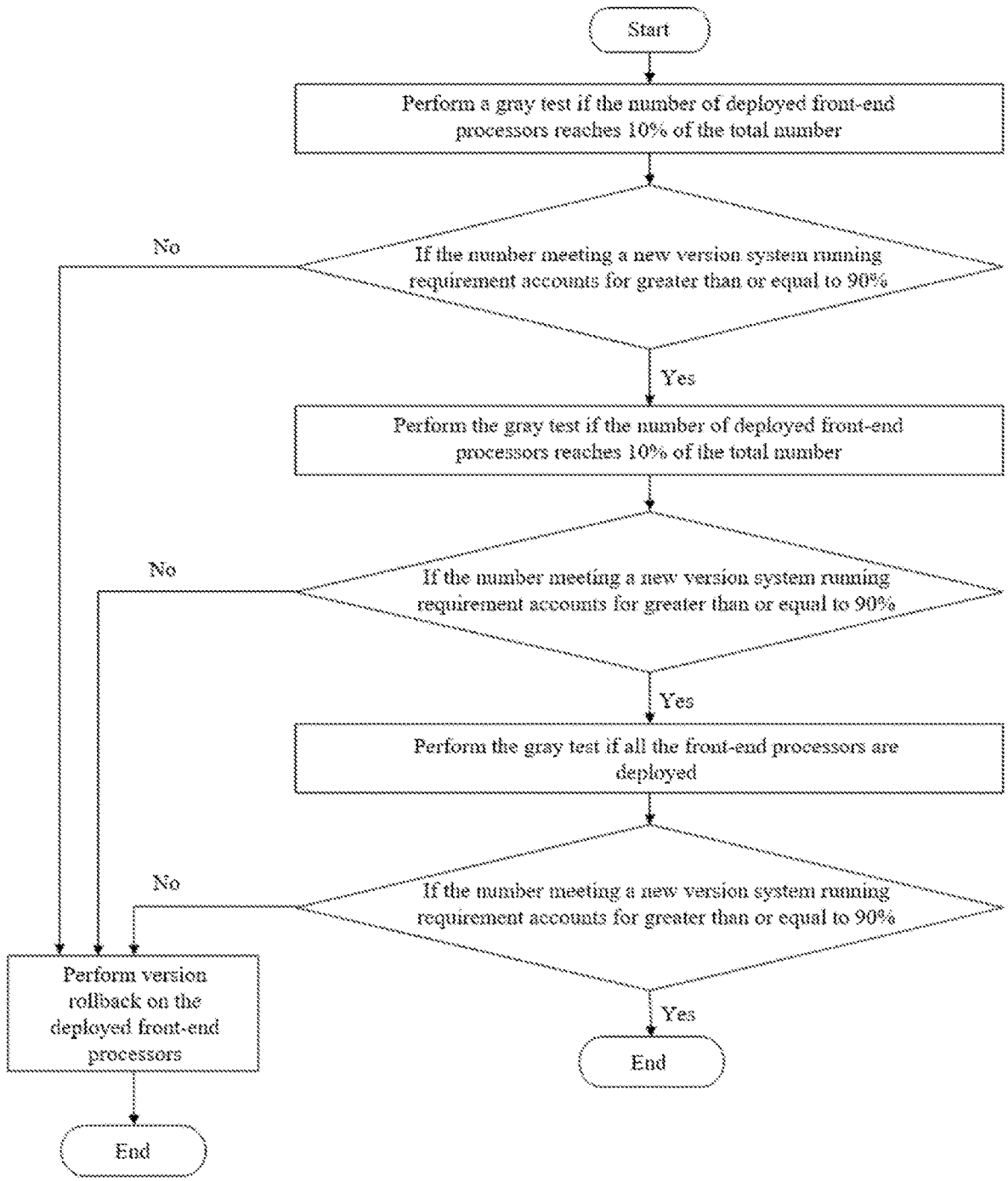
FIG. 4 is a schematic diagram of automatically deploying a front-end processor based on gray release in an embodiment.
Figure 5:
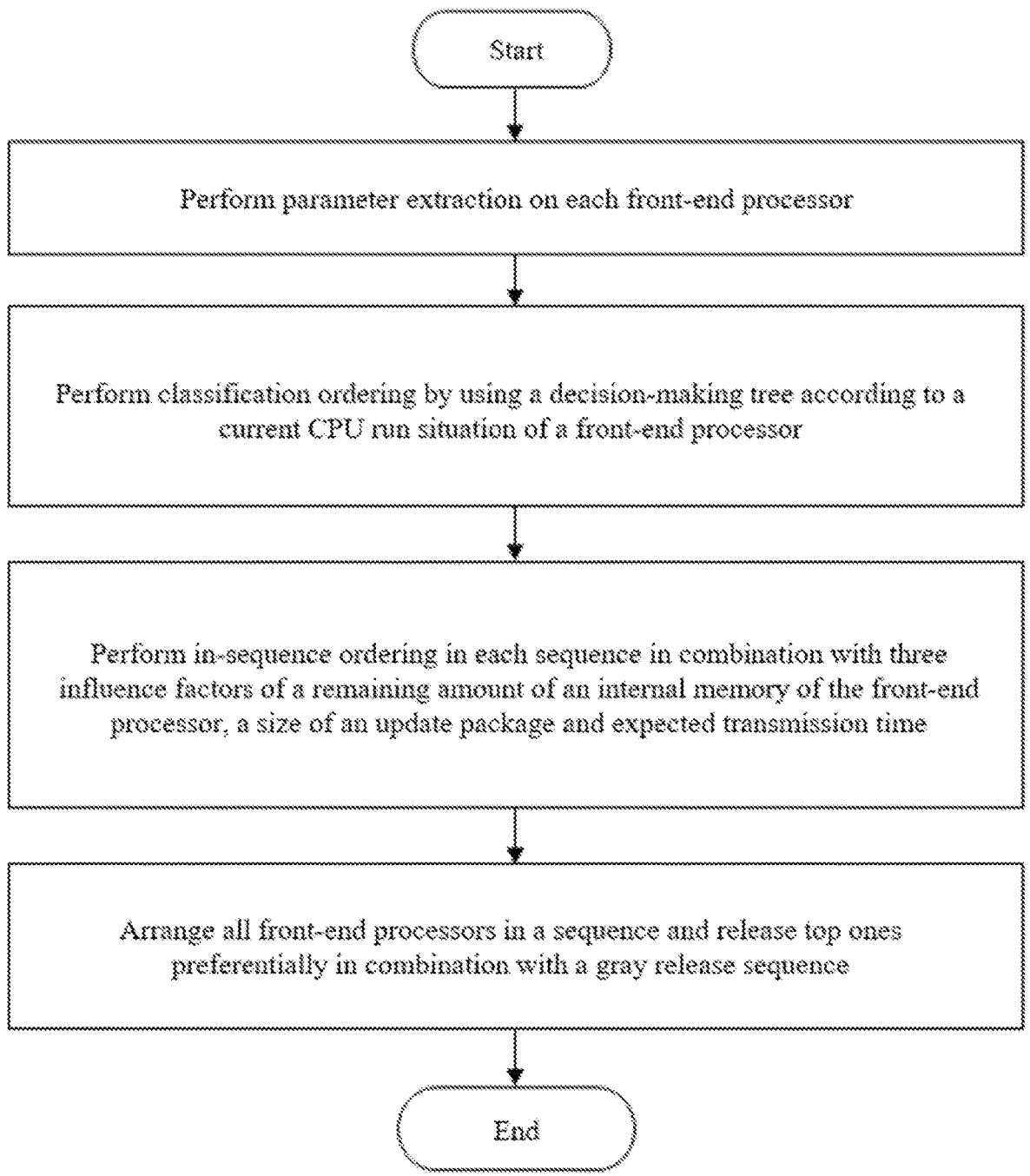
FIG. 5 is a schematic diagram of a logical judgment of releasing by task scheduling in an embodiment.

Referring to FIG. 3 to FIG. 5, step S1: version management is performed on to-be-deployed engineering by using an engineering code version management repository, the engineering code version management repository being deployed on a remote server.

A code management permission is open merely to a user to guarantee integrity, confidentiality and security of an engineering code.

The user needs to manage a main version and a branch version of the code in the engineering code version management repository by himself to guarantee that no error is caused by the engineering during releasing.

Step S2: a user management module is logged in for identity identification, and verification of an operating permission for a plurality of front-end processors and an operating permission for engineering configurations of the plurality of front-end processors.

Step S3: parameter extraction is performed on the front-end processors, all the front-end processors are arranged in a sequence according to extracted parameters, and gray release deployment is performed on the top front-end processors in the sequence preferentially.

Sub-step S31: parameter extraction is performed on each front-end processor.

A CPU running condition of the front-end processor, a current internal memory use status and a network bandwidth are obtained by a web service. A procedure is run on a monitored front-end processor server, a heartbeat connection is kept, detection information is polled regularly and sent to the system in real time, and a size of an update package may also be obtained through calculation while the update package is generated.

A system load is a measure of system CPU busyness, that is, how many procedures wait for being dispatched by a CPU (a procedure wait queue length). The load average is a load average of the system within a period of time, the period of time is usually 1 minute, 5 minutes and 15 minutes. Current load average parameters are extracted, and there is a total of 3 parameters, which are set to be load1 ($i$), load5($i$) and load15($i$).

The front-end processor usually contains a plurality of CPU cores inside a CPU, which is called a multi-core CPU. In terms of a system load, how many cores does a CPU of a computer have has to be considered. Then the system load is divided by the total number of cores, and it shows that the computer runs normally as long as a load of each core does not exceed 1.0. Then the number of CPU cores of the current front-end processor is extracted and marked as c(i).

Sub-step S311: a remaining amount M(i) of an internal memory of the current front-end processor is extracted and marked as M(i);

sub-step S312: a network bandwidth W(i) is extracted;

sub-step S313: the size U(i) of the update package is extracted; and sub-step S314: the expected transmission time T(i)=U(i)/W(i) of the update package is calculated according to the network bandwidth and the size of the update package.

Sub-step S32: classification is performed by using a decision-making tree according to a current CPU load situation of the front-end processor to sequentially obtain a plurality of initial sequences.

Specifically, sequence dividing is performed on to-be-deployed front-end processors according to a CPU load average and the number of CPU cores, and four dividing conditions are as follows:

dividing the front-end processors where a load average of one minute is smaller than the number of the CPU cores into a first sequence;

dividing the front-end processors where a load average of one minute is greater than or equal to the number of the CPU cores and the front-end processors where a load average of five minutes is smaller than the number of the CPU cores into a second sequence;

dividing the front-end processors where a load average of one minute is greater than or equal to the number of the CPU cores, the front-end processors where a load average of five minutes is greater or equal to the number of the CPU cores and the front-end processors where a load average of fifteen minutes is smaller than the number of the CPU cores into a third sequence; and dividing the rest of front-end processors into a fourth sequence.

In order to make a deployment process stable in whole, engineering deployment needs to be performed firstly on the front-end processor whose CPU is idle currently. In general, the load average is related to the number of the CPU cores. Taking a machine with a single core as an example, load=0.5 represents that the CPU still has half of resources for processing other thread requests, load=1 represents that all resources of the CPU are processing requests, and there is no remaining resource for use, and load=2 represents that the CPU has run in overload, and there are still doubled threads waiting for being processed. Thus, as for the single-core machine, in an ideal state, the load average is smaller than 1. Likewise, as for a multi(n)-core CPU, the load average is smaller than n.

The load average has a total of three parameters, which respectively represent load averages of 1 minute, 5 minutes and 15 minutes, so how to judge a current CPU actual running load may be analyzed concretely in combination with specific situations (n cores).

1 minute Load>n, 5 minutes Load<n, and 15 minutes Load<n: busy in a short term and idle in a medium term and a long term, and it may be merely "jitter" or may also be system "congestion precursor". 1 minute Load>n, 5 minutes Load>n, and 15 minutes Load<n: busy in a short term and a medium term, and idle in a long term, and the system is in "congestion start".

1 minute Load>n, 5 minutes Load>n, and 15 minutes>n: busy in a short term, a medium term and a long term, and the system is in "under congestion".

1 minute Load<n, 5 minutes Load>n, and 15 minutes Load>n: idle in a short term, and busy in a medium term and a long term, and the system is in "recovering from congestion".

Figure 6:
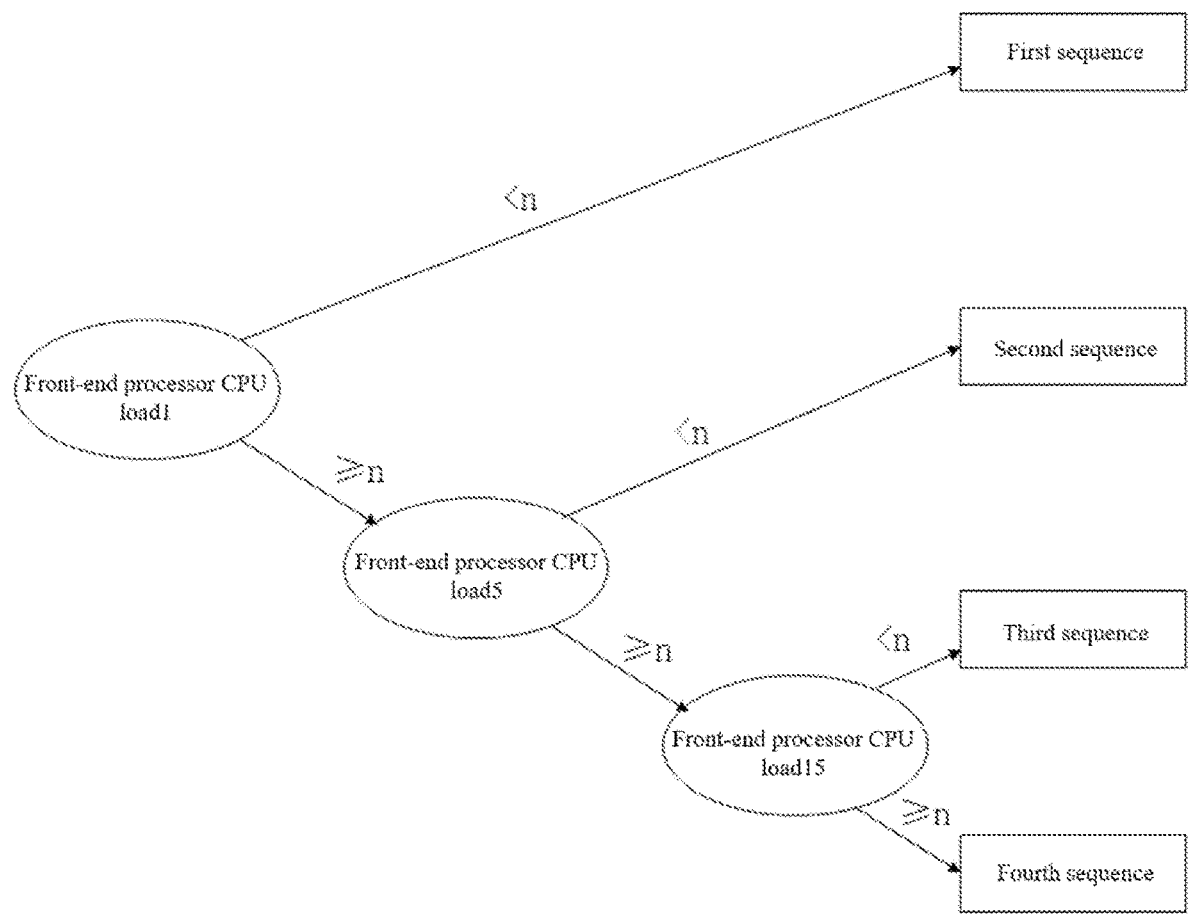
FIG. 6 is a mode of performing sequence dividing on a to-be-updated front-end processor in combination with a load average and the number of CPU cores based on a decision-making tree in an embodiment.

Thus, sequence dividing is performed on a to-be-updated front-end processor in combination with the load average and the number of the CPU cores by using a decision-making tree, as shown in FIG. 6.

The front-end processors where load1($i$)<n are divided into a first sequence;

the front-end processors where load1($i$)>n and load5($i$)<n are divided into a second sequence;

the front-end processors where load1($i$)>n, load5($i$)>n and load15($i$)<n are divided into a third sequence; and the rest of front-end processors are divided into a fourth sequence.

Sub-step S33: in-sequence ordering is performed in each initial sequence in combination with a remaining amount of an internal memory of the front-end processor, a size of an update package and expected transmission time to obtain a sequence.

In order to measure high or low of a load of the front-end processor, the expected total deployment time E(i) of the front-end processor is defined here as:

$$E(i)=H(M(i),U(i),U(i)/M(i))+T(i)$$

Defining a priority E(i) of the front-end processor is determined mainly by the remaining amount M(i) of an internal memory of the front-end processor, the size U(i) of the update package and an internal memory read update package acting factor U(i)/M(i) and the expected transmission time T(i) of the update package.

Sizes of specific influence factors in H(M(i),U(i),U(i)/M(i)) need to be measured by an experiment.

For example, after an update package compressed file of a 200 M size is actually measured by the plurality of front-end processors (measured repeatedly by 50 front-end processors), actual update deployment time under different front-end processor parameters are obtained. A PCA dimensionality reduction operation is introduced here, and a data main feature component is extracted from a three-dimensional array through H(M(i),U(i),U(i)/M(i)) and the actual deployment time of the front-end processor.

Sub-step S331: the remaining amount of the internal memory of the front-end processor, the size of the update package and the expected transmission time constitute a matrix with 3 rows and 200 columns.

Sub-step S332: zero-mean normalization is performed on each row (representing an attribute field) of the matrix.

Sub-step S333: a covariance matrix is obtained.

Sub-step S334: an eigenvalue and a corresponding eigenvector r of the covariance matrix are obtained.

Sub-step S335: eigenvectors r are arranged to form a new matrix P from top to bottom in row according to sizes of corresponding eigenvalues.

Sub-step S336: data which is Y=PX, that is, one-dimension through dimensionality reduction are taken to obtain a feature component (m(i),u(i),um(i)), and expected total deployment time H(M(i),U(i),U(i)/M(i)) =(m(i),u(i),um(i))(M(i),U(i),U(i)/M(i)) of each front-end processor is calculated.

Sub-step S337: the front-end processors are arranged in a positive sequence according to the expected total deployment time, where the shorter the total deployment time is, the more forward the sequence numbers of the front-end processors are.

Figure 7:
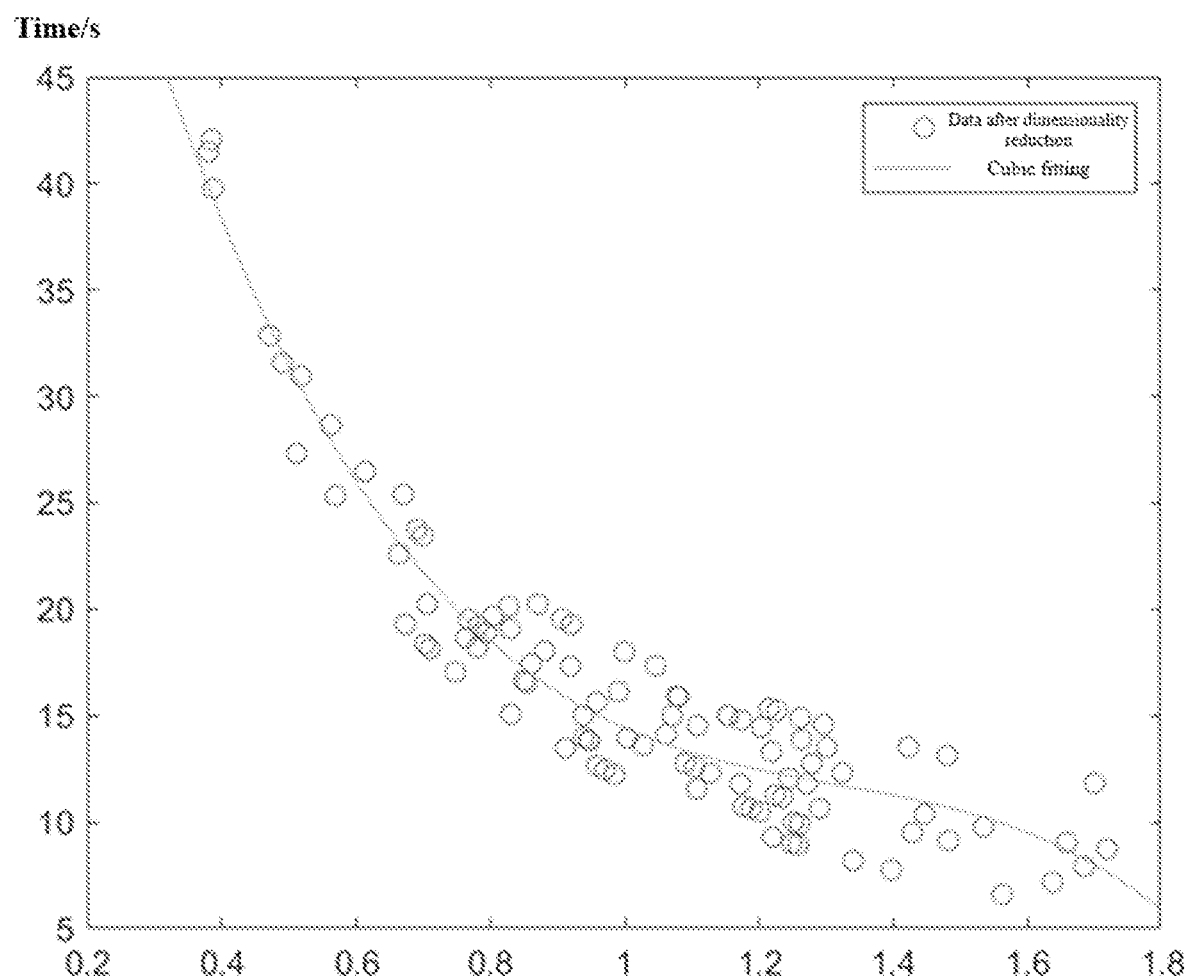
FIG. 7 is a schematic diagram of fitting made according to actual deployment time of an update package compressed file of a 200 M size after PCA dimensionality reduction based on a task scheduling priority algorithm in an embodiment.

Referring to FIG. 7, according to a task scheduling priority algorithm of the present disclosure, it may be seen that a degree of fitting of an actual deployment time arrangement sequence of the compressed file of the 200 M size after PCA dimensionality reduction is high. In the figure, "data after dimensionality reduction" represents points where one-dimension data after PCA dimensionality reduction correspond to time.

Hardware configuration, an internal memory capacity and a working frequency of a local host determine that only a few procedures may be performed at the same time at a time, that is, a deployment work may be performed on a few front-end processors at the same time at a time. In order to guarantee that more front-end processors are deployed faster, the front-end processor with the shorter expected total deployment time is subjected to the deployment work preferentially according to sequence numbers, and engineering deployment work of follow-up front-end processors is performed in sequence after deployment of the front-end processor ranking top is completed.

For example, the local host can be in abutting joint with merely five front-end processors at the same time at a time for large engineering deployment work. First, deployment work is performed on the top five front-end processors respectively, which occupies five procedures, and when deployment work of a certain front-end processors is completed and the corresponding procedure is idle, the deployment work is performed on the front-end processor ranking sixth in sequence. When the deployment work of another front-end processor is completed and the corresponding procedure is idle, the deployment work is performed on the front-end processor ranking seventh in sequence, and so on till all the front-end processors entering a scheduling system enter the deployment work state or a deployment work completed state, and execution of a scheduling function is completed.

The task scheduling function preferentially transmits the front-end processors which are idle and need a smaller update package and these front-end processors take relatively less time in the corresponding deployment processes, so time for a gray test of top 10% and top 40% of the front-end processors is shortened in the whole deployment process, a problem may be discovered and adjusted earlier during the initial gray scale, and high efficiency and stability of the system are improved. As for the rest 60% of the front-end processors, this task scheduling strategy gives priority to a server with a low CPU load and a large internal memory remaining capacity, that is, a machine which is idle and high in deployment speed is deployed preferentially, and thus high efficiency of the deployment system is also improved on another level.

In order to make the whole deployment process stabler and faster, a function of gray release needs to be introduced here. A whole deployment condition and whether each front-end processor engineering runs normally are checked stage by stage in the deployment process, so as to judge whether a current updated version adapts to all the front-end processors and whether deployment continues or stops, and an operation of version rollback is performed on the previously deployed front-end processors, so as to guarantee that front-end processor engineering versions are consistent, to guarantee smooth transition of a previous version and a next version of the system, and to avoid a phenomenon of failure in whole deployment of a new version of the system due to the fact that the previous version and the next version of too many front-end processors are not adapted.

The gray release process is a staged deployment and detection process. In an actual operation, engineering version updating usually have many unexpected errors and unconsidered points in combination with an actual condition of the front-end processors, so a situation is very common that a lot of errors are detected after deployment is completed, and version rollback is needed. If a problem can be detected earlier and faster, that is, the problem is detected in first two rounds of gray release for 10% and 40%, as a lot of time is consumed during engineering packing and transmission of the front-end processors, the task scheduling function is introduced here, a deployment sequence is optimized in combination with an actual condition of to-be-deployed front-end processors, time of the whole deployment is shortened, and efficiency is improved.

Sub-step S34: a sequence number of each front-end processor in each sequence is determined, all front-end processors are arranged in the sequence and according to positions within the sequence, and gray release deployment is performed on the top front-end processors in the sequence preferentially.

Step S4: when gray release deployment is to be performed on 10% of the front-end processors, top 10% of the front-end processors in a total front-end processor queue are sequentially deployed and a gray scale test is performed after deployment is completed, and when the number of front-end processors meeting smoothness of new and old function ports and overall running stability of a system accounts for greater than or equal to 90% of the number of deployed front-end processors, gray release is continued; and otherwise, version rollback is performed on the deployed front-end processors till engineering on all front-end processors returns to a previous version, and the gray release is finished;

Step S5: when the gray release deployment is to be performed on 10% to 40% of the front-end processors, the rest 90% of the front-end processors need to be reordered according to step S3, the top front-end processors, accounting for 30% of the total number of the front-end processors, in the rest of front-end processors are sequentially deployed, a gray scale test is performed after deployment is completed, and when the number of the front-end processors meeting smoothness of new and old function ports and overall running stability of the system accounts for greater than or equal to 90% of the number of deployed front-end processors, gray release is continued; and otherwise, version rollback is performed on the deployed front-end processors till engineering on all front-end processors returns to a previous version, and the gray release is finished.

Step S6: when the gray release needs to be performed on the rest 60% of the front-end processors, the rest of front-end processors need to be reordered according to step S3, the rest of front-end processors are sequentially deployed, a gray scale test is performed after deployment is completed, and when the number of the front-end processors meeting smoothness of new and old function ports and overall running stability of the system accounts for greater than or equal to 90% of the number of deployed front-end processors, troubleshooting is performed manually on unsuccessfully deployed front-end processors for manually updating deployment; and otherwise, version rollback is performed on the deployed front-end processors till engineering on all front-end processors returns to a previous version.

A specific method of deployment includes the following steps:

step 1: a user sends an automatic deployment request of front-end processor engineering to the central computer by using a version iteration module, and the central computer downloads a version code corresponding to the engineering from the engineering code version management repository, generates an engineering update package in combination with an engineering version of the current front-end processor, and compresses the engineering update package by using an ssh agent;

the engineering update package is compressed into a tar file, so a volume is reduced, and subsequent file transmission with the front-end processors is convenient;

the automatic deployment request includes address information a to-be-deployed front-end processor, transmission verification information, an environment corresponding to the front-end processor engineering and a version number of the to-be-deployed engineering; and an engineering file folder downloaded by the central computer according to a version number in a request lacks a running configuration parameter of the engineering, so the folder does not have an actual running condition and can be merely used for packed transmission.

Taking java engineering deployed on the computer currently as an example, an actual size of an unpacked engineering update package is about 2.2 MB, a packed size is about 800 KB, so a transmission speed between the central computer and the front-end processors is greatly improved, and meanwhile, it also aims at improving transmission efficiency in such a scenario as transmission between the central computer and the plurality of front-end processors.

Step 2: the compressed engineering update package is transmitted onto a position corresponding to engineering of the current front-end processor and decompressed to obtain a decompressed update package.

There may be a large difference in time in this process according to the size of the engineering update package, a size of compressed tar file, a bandwidth of the current front-end processor, a remaining amount of an internal memory of the current front-end processor and a remaining CPU load, this process uses the ssh agent and adopts SCP transmision, and execution is convenient and fast.

Step 3: the user pulls down a front-end processor engineering parameter corresponding to an operation of this time from a front-end processor engineering configuration module to a front-end processor engineering directory.

Step 3 further includes performing, by the user, configuration parameter management corresponding to the front-end processor after the user logs in the front-end processor engineering configuration module when the front-end processor needs to be adjusted in a running configuration parameter; where the running configuration parameter of the front-end processor is stored in a database of the central computer in a form of key-value pair according to the front-end processor and a running environment, the configuration parameter management refers to an operation on a level of a database, the stored running configuration parameter is transmitted to a directory corresponding to the front-end processor engineering generated in step 2, so as to automatically generate a configuration file, taking java engineering as an example, that is, a configuration file is generated under a resource directory.

Step 4: the user sends a request for finally updating the engineering to the current front-end processor, the engineering is packed after the current front-end processor receives the request, and a startup script is executed to run the engineering in a docker container.

Step 4 specifically includes running an automatic deployment script on the front-end processor by using the ssh agent, where the step of the automatic deployment script is sequentially: engineering packing, container stopping running, container deletion, mirror image deletion, new mirror image re-establishment, container re-establishment and container running.

Step 5: the current front-end processor automatically deletes an engineering code for packing to complete engineering deployment.

The present disclosure regulates all operation technical information and operator information in the automatic deployment process of the front-end processors. By dynamically searching for the operating permission of the operator, the operating behavior of the operator is regulated, the front-end processors engineering versions are dynamically managed, the engineering configuration is endowed according to the environment, real-time background log check is provided, and system security and flexibility and the robustness of the front-end processor engineering are ensured. Update time of some front-end processors is optimized reasonably through the gray release in combination with the task scheduling function, whole time of batch automatic deployment is shortened, the efficiency of the system is improved, a VUE front-end technical framework is adopted, the database adopts an Oracle storage architecture, and thus characteristics of being high in processing speed and high in security level are achieved.

The above description is merely preferred embodiments of the present disclosure instead of limiting the present disclosure. As for those skilled in the art, the present disclosure may have various variations and changes. Any modification, equivalent replacement, improvement and the like made within the spirit and principle of the present disclosure should be contained in the protection scope of the present disclosure.

What is claimed is:

1. A method for automatically and quickly deploying a front-end processor based on gray release, comprising steps of:
   step S1: performing version management on to-be-deployed engineering by using an engineering code version management repository, the engineering code version management repository being deployed on a remote server;
   step S2: logging in a user management module for identity identification, and verification of an operating permission for a plurality of front-end processors and an operating permission for engineering configurations of the plurality of front-end processors;
   step S3: performing parameter extraction on the front-end processors, arranging all the front-end processors in a sequence according to the extracted parameters, and performing gray release deployment on the top front-end processors in the sequence;
   step S4: when the gray release deployment is to be performed on 10% of the front-end processors, sequentially deploying the top 10% of the front-end processors in a total front-end processor queue and performing a gray scale test after deployment is completed, and when a number of front-end processors meeting smoothness of new and old function ports and overall running stability of a system accounts for greater than or equal to 90% of a number of deployed front-end processors, continuing gray release; and otherwise, performing version rollback on the deployed front-end processors until the engineering on all front-end processors returns to a previous version, and finishing the gray release;
   step S5: when the gray release deployment is to be performed on 10% to 40% of the front-end processors, reordering a last 90% of the front-end processors in the total front-end processor queue according to step S3, sequentially deploying a first one-third of the front-end processors in the reordered front-end processor queue, performing a gray scale test after deployment is completed, and when the number of the front-end processors meeting smoothness of new and old function ports and overall running stability of the system accounts for greater than or equal to 90% of the number of deployed front-end processors, continuing the gray release; and otherwise, performing version rollback on the deployed front-end processors until the engineering on all front-end processors returns to a previous version, and finishing the gray release; and
   step S6: when the gray release deployment is to be performed on a last-two-thirds of the front-end processors in the reordered front-end processor queue, reordering the last two-thirds of the front-end processors in the reordered front-end processor queue according to step S3, sequentially deploying all front-end processors in a front-end processor queue that has been reordered again, performing a gray scale test after deployment is completed, and when the number of the front-end processors meeting smoothness of new and old function ports and overall running stability of the system accounts for greater than or equal to 90% of the number of deployed front-end processors, performing troubleshooting manually on unsuccessfully deployed front-end processors for manually updating deployment; and otherwise, performing version rollback on the deployed front-end processors until the engineering on all front-end processors returns to a previous version.

2. The method for automatically and quickly deploying the front-end processor based on the gray release according to claim 1, wherein step S3 comprises sub-steps of:
   step S31: performing parameter extraction on each front-end processor;
   step S32: performing classification by using a decision-making tree according to a current CPU load situation of the front-end processor to sequentially obtain a plurality of initial sequences;
   step S33: performing in-sequence ordering in each initial sequence in combination with a remaining amount of an internal memory of the front-end processor, a size of an update package and expected transmission time to obtain a sequence; and
   step S34: determining a sequence number of each front-end processor in each sequence, arranging all front-end processors in the sequence and according to positions within the sequence, and performing gray release deployment in order of sequence numbers from front to back.

3. The method for automatically and quickly deploying the front-end processor based on gray release according to claim 2, wherein step S31 comprises sub-steps of:
   step S311: extracting a remaining amount of an internal memory of a current front-end processor;
   step S312: extracting a network bandwidth;
   step S313: extracting the size of the update package; and
   step S314: calculating the expected transmission time of the update package according to the network bandwidth and the size of the update package.

4. The method for automatically and quickly deploying the front-end processor based on gray release according to claim 2, wherein step S32 is performing sequence dividing on to-be-deployed front-end processors according to a CPU load average and a number of CPU cores, and four dividing conditions are as follows:
   dividing the front-end processors where a load average of one minute is smaller than the number of the CPU cores into a first sequence;
   dividing the front-end processors where a load average of one minute is greater than or equal to the number of the CPU cores and the front-end processors where a load average of five minutes is smaller than the number of the CPU cores into a second sequence;
   dividing the front-end processors where a load average of one minute is greater than or equal to the number of the CPU cores, the front-end processors where a load average of five minutes is greater or equal to the number of the CPU cores and the front-end processors where a load average of fifteen minutes is smaller than the number of the CPU cores into a third sequence; and
   dividing the rest of the front-end processors into a fourth sequence.

5. The method for automatically and quickly deploying the front-end processor based on gray release according to claim 2, wherein step S33 comprises sub-steps of:
   step S331: composing the remaining amount of the internal memory of the front-end processor, the size of the update package and the expected transmission time into a matrix;
   step S332: performing zero-mean normalization on each row of the matrix;
   step S333: obtaining a covariance matrix;
   step S334: obtaining an eigenvalue and a corresponding eigenvector of the covariance matrix;

step S335: arranging eigenvectors by row, from top to bottom, according to sizes of corresponding eigenvalues to form a new matrix;

step S336: taking data which is one-dimension through dimensionality reduction to obtain a feature component, and calculating expected total deployment time of each front-end processor; and step S337: arranging the front-end processors in a positive sequence according to the expected total deployment time, wherein the shorter the total deployment time, the more front the sequence numbers of the front-end processors.

6. The method for automatically and quickly deploying the front-end processor based on gray release according to claim 1, wherein the method further comprises steps of:

step 1: sending, by a user, an automatic deployment request of front-end processor engineering to a central computer by using a version iteration module, downloading, by the central computer, a version code corresponding to the to-be-deployed engineering from the engineering code version management repository, generating an engineering update package in combination with an engineering version of a current front-end processor, and compressing the engineering update package by using a ssh agent;

step 2: transmitting the compressed engineering update package onto a position corresponding to engineering of the current front-end processor and performing decompression to obtain a decompressed update package;

step 3: pulling down, by the user, a front-end processor engineering parameter corresponding to the automatic deployment request of front-end processor engineering from a front-end processor engineering configuration module to a front-end processor engineering directory;

step 4: sending, by the user, a request for finally updating the engineering to the current front-end processor, packing the engineering after the current front-end processor receives the request, and executing a startup script to run the engineering in a docker container; and step 5: automatically deleting, by the current front-end processor, an engineering code for packing to complete engineering deployment.

7. The method for automatically and quickly deploying the front-end processor based on gray release according to claim 6, wherein in step 1, the automatic deployment request comprises address information of a to-be-deployed front-end processor, transmission verification information, an environment corresponding to the front-end processor engineering and a version number of the to-be-deployed engineering.

8. The method for automatically and quickly deploying the front-end processor based on gray release according to claim 6, wherein step 3 further comprises performing, by the user, configuration parameter management corresponding to the front-end processor after the user logs in the front-end processor engineering configuration module when the front-end processor needs to be adjusted in a running configuration parameter; wherein the running configuration parameter of the front-end processor is stored in a database of the central computer in a form of key-value pair according to the front-end processor and a running environment, the configuration parameter management refers to an operation on a level of the database, and the stored running configuration parameter is transmitted to a directory corresponding to the engineering of the current front-end processor in step 2, so as to automatically generate a configuration file.

9. The method for automatically and quickly deploying the front-end processor based on gray release according to claim 6, wherein step 4 further comprises running an automatic deployment script on the front-end processor by using the ssh agent, wherein the step of the automatic deployment script is in a sequence of: engineering packing, container stopping running, container deletion, mirror image deletion, new mirror image re-establishment, container re-establishment and container running.

10. A system for automatically and quickly deploying a front-end processor based on gray release, comprising:
at least one processor, and
a memory storing instructions executable by the at least one processor; wherein the instructions when executed by the at least one processor cause the at least one processor to perform steps of:

step S1: performing version management on to-be-deployed engineering by using an engineering code version management repository, the engineering code version management repository being deployed on a remote server;

step S2: logging in a user management module for identity identification, and verification of an operating permission for a plurality of front-end processors and an operating permission for engineering configurations of the plurality of front-end processors;

step S3: performing parameter extraction on the front-end processors, arranging all the front-end processors in a sequence according to the extracted parameters, and performing gray release deployment on the top front-end processors in the sequence;

step S4: when the gray release deployment is to be performed on 10% of the front-end processors, sequentially deploying the top 10% of the front-end processors in a total front-end processor queue and performing a gray scale test after deployment is completed, and when a number of front-end processors meeting smoothness of new and old function ports and overall running stability of a system accounts for greater than or equal to 90% of a number of deployed front-end processors, continuing the gray release; and otherwise, performing version rollback on the deployed front-end processors until the engineering on all front-end processors returns to a previous version, and finishing the gray release;

step S5: when the gray release deployment is to be performed on 10% to 40% of the front-end processors, reordering a last 90% of the front-end processors in the total front-end processor queue according to step S3, sequentially deploying a first one-third of the front-end processors in the reordered front-end processor queue, performing a gray scale test after deployment is completed, and when the number of the front-end processors meeting smoothness of new and old function ports and overall running stability of the system accounts for greater than or equal to 90% of the number of deployed front-end processors, continuing the gray release; and otherwise, performing version rollback on the deployed front-end processors until the engineering on all front-end processors returns to a previous version, and finishing the gray release; and step S6: when the gray release deployment is to be performed on a last-two-thirds of the front-end processors in the reordered front-end processor queue, reordering the last two-thirds of the front-end processors in the reordered front-end processor queue according to step S3, sequentially deploying all front-end processors in a front-end processor queue that has been reordered again, performing a gray scale test after deployment is completed, and when the number of the front-end processors meeting smoothness of new and old function ports and overall running stability of the system accounts for greater than or equal to 90% of the number of deployed front-end processors, performing troubleshooting manually on unsuccessfully deployed front-end processors for manually updating deployment; and otherwise, performing version rollback on the deployed front-end processors until the engineering on all front-end processors returns to a previous version;

the instructions when executed by the at least one processor causing the at least one processor to further:

perform an adding, deleting, checking and changing operation for a user, configure an operating permission of the user, improve security of system version iteration, provide a function of logging in or logging out of the system and, obtain an operating permission for the front-end processor, wherein user information is recorded in a background database of a central computer;

distinguish configuration information needed for engineering packing by each front-end processor under each environment, create an environment needed for engineering normal running, provide an adding, deleting, checking and changing operation, store in the background database of the central computer in a form of a front-end processor serial number, a running environment and a configuration entry key-value pair in a unified mode and, obtain an engineering configuration parameter during automatic deployment each time for engineering gray release of a plurality of front-end processors and calling a task scheduling function;

monitor and record current running environment information of each front-end processor, use the information as a basis of user remote management, control over the front-end processor and making a release strategy by optimizing a gray release sequence through an algorithm and, provide an adding, deleting, checking and changing operation, wherein version iteration information of each environment of the front-end processor is recorded in the background database of the central computer; and store, manage and obtain each version code of the engineering and, perform updating or rollback of a current code.

* * * * *